(12) United States Patent
Dere

(10) Patent No.: US 7,752,574 B2
(45) Date of Patent: Jul. 6, 2010

(54) SYSTEM, METHOD AND ARTICLE FOR DISPLAYING DATA DISTRIBUTIONS IN DATA TREES

(75) Inventor: Vikram Dere, Durham, NC (US)

(73) Assignee: SAS Institute Inc., Cary, NC (US)

( * ) Notice: Subject to any disclaimer, the term of this patent is extended or adjusted under 35 U.S.C. 154(b) by 504 days.

(21) Appl. No.: 11/541,873

(22) Filed: Oct. 2, 2006

(65) Prior Publication Data

US 2008/0082561 A1     Apr. 3, 2008

(51) Int. Cl.
*G06F 3/00* (2006.01)

(52) U.S. Cl. .............. 715/853; 715/713; 715/810; 715/764

(58) Field of Classification Search ............ 715/810, 715/713, 764, 853; 395/12, 50, 60; 364/518, 364/521

See application file for complete search history.

(56) References Cited

U.S. PATENT DOCUMENTS

| | | | | |
|---|---|---|---|---|
| 4,613,946 A | * | 9/1986 | Forman ................. | 715/853 |
| 4,977,971 A | * | 12/1990 | Crane et al. .............. | 180/8.3 |
| 5,065,347 A | * | 11/1991 | Pajak et al. ............. | 715/835 |
| 5,537,618 A | * | 7/1996 | Boulton et al. ............ | 715/745 |
| 5,758,026 A | * | 5/1998 | Lobley et al. ............. | 706/11 |
| 6,115,044 A | * | 9/2000 | Alimpich et al. ........... | 715/855 |
| 6,564,197 B2 | * | 5/2003 | Sahami et al. ............. | 706/55 |
| 6,628,312 B1 | * | 9/2003 | Rao et al. ................ | 715/853 |
| 6,631,362 B1 | * | 10/2003 | Ullman et al. ............. | 706/60 |
| 7,171,628 B1 | * | 1/2007 | Perttunen ................. | 715/853 |
| 2002/0070984 A1 | * | 6/2002 | Newman ................. | 345/853 |
| 2003/0126136 A1 | * | 7/2003 | Omoigui .................. | 707/10 |
| 2003/0174179 A1 | * | 9/2003 | Suermondt et al. ......... | 345/853 |
| 2004/0168115 A1 | * | 8/2004 | Bauernschmidt et al. .... | 715/500 |
| 2005/0166149 A1 | * | 7/2005 | Frigon et al. ............. | 715/712 |
| 2005/0177598 A1 | * | 8/2005 | Hao et al. ............... | 707/104.1 |
| 2005/0267835 A1 | * | 12/2005 | Condron et al. ............ | 705/37 |
| 2006/0004682 A1 | * | 1/2006 | Danielson et al. .......... | 706/52 |

* cited by examiner

*Primary Examiner*—Simon Ke
*Assistant Examiner*—Erik V Stitt
(74) *Attorney, Agent, or Firm*—Jones Day

(57) ABSTRACT

Systems, methods and articles for displaying data distributions in data trees are provided. An example method retrieves a data tree organized into a plurality of nodes that store a data parameter and identifies a parent node from among the plurality of nodes, the parent node being linked to a plurality of child nodes in the data tree. The relative distribution of the data parameter among the plurality of child nodes is determined and a plurality of graphical connectors that visually link the parent node to the child nodes are displayed on a computer display, each of the graphical connectors including a data distribution indicator that indicates the relative distribution of the data parameter among the child nodes.

30 Claims, 7 Drawing Sheets

SYSTEM, METHOD AND ARTICLE FOR DISPLAYING DATA DISTRIBUTIONS IN DATA TREES

TECHNICAL FIELD

This application describes software-implemented systems, methods and articles of manufacture for displaying data distributions in data trees.

BACKGROUND

Data trees are useful in representing hierarchical information. A data tree typically includes a plurality of tree nodes that contain text and/or graphics that represent the data content of the node. Tree nodes are typically referred to as parent nodes or child nodes, with the child nodes depending from the parent nodes. In some data trees, the data of the parent node is divided among its child nodes. Thus, for example, if the data in the parent node represents total sales for an entire corporation, then the child nodes may represent the various divisions of the corporation and each child node contains the sales for the respective division. In this scenario, it would be very useful to be able to quickly ascertain the relative distribution of the parent data among the child nodes. In other words, what percentage of the total sales are represented by each division of the corporation. In known systems for displaying data trees, a user would have to interrogate each child node, and the parent node, and then compare the data values therein in order to determine the relative distribution of data among the child nodes.

SUMMARY

Systems, methods and articles for displaying data distributions in data trees are provided. An example method retrieves a data tree organized into a plurality of nodes that store a data parameter and identifies a parent node from among the plurality of nodes, the parent node being linked to a plurality of child nodes in the data tree. The relative distribution of the data parameter among the plurality of child nodes is determined and a plurality of graphical connectors that visually link the parent node to the child nodes are displayed on a computer display, each of the graphical connectors including a data distribution indicator that indicates the relative distribution of the data parameter among the child nodes.

An example system includes a data structure for storing a data tree and a computer-readable memory encoded with software instructions. The data tree stored in the data structure is organized into a plurality of nodes that represent a data parameter, the plurality of nodes including at least one parent node and a plurality of child nodes associated with the parent node. The software instructions encoded in the memory determine the relative distribution of the data parameter among the plurality of child nodes and display a plurality of graphical connectors that visually link the parent node to the child nodes on a computer display, wherein each of the graphical connectors includes a data distribution indicator that indicates the relative distribution of the data parameter among the child nodes.

Another example system includes a data store for storing a data tree organized into a plurality of nodes that represent a data parameter; a graphical user interface module for selecting a display format for the data tree; a data selection module for identifying a parent node from among the plurality of nodes, the parent node being linked to a plurality of child nodes in the data tree; and a processing module for receiving the selected display format and the identified parent node, and for displaying at least a portion of the data tree associated with the parent node and its linked child nodes on a computer display, wherein the processing module determines the relative distribution of the data parameter among the plurality of child nodes and displays a plurality of graphical connectors that visually link the parent node to the child nodes on the computer display, each of the graphical connectors including a data distribution indicator.

DETAILED DESCRIPTION

Figure 1:
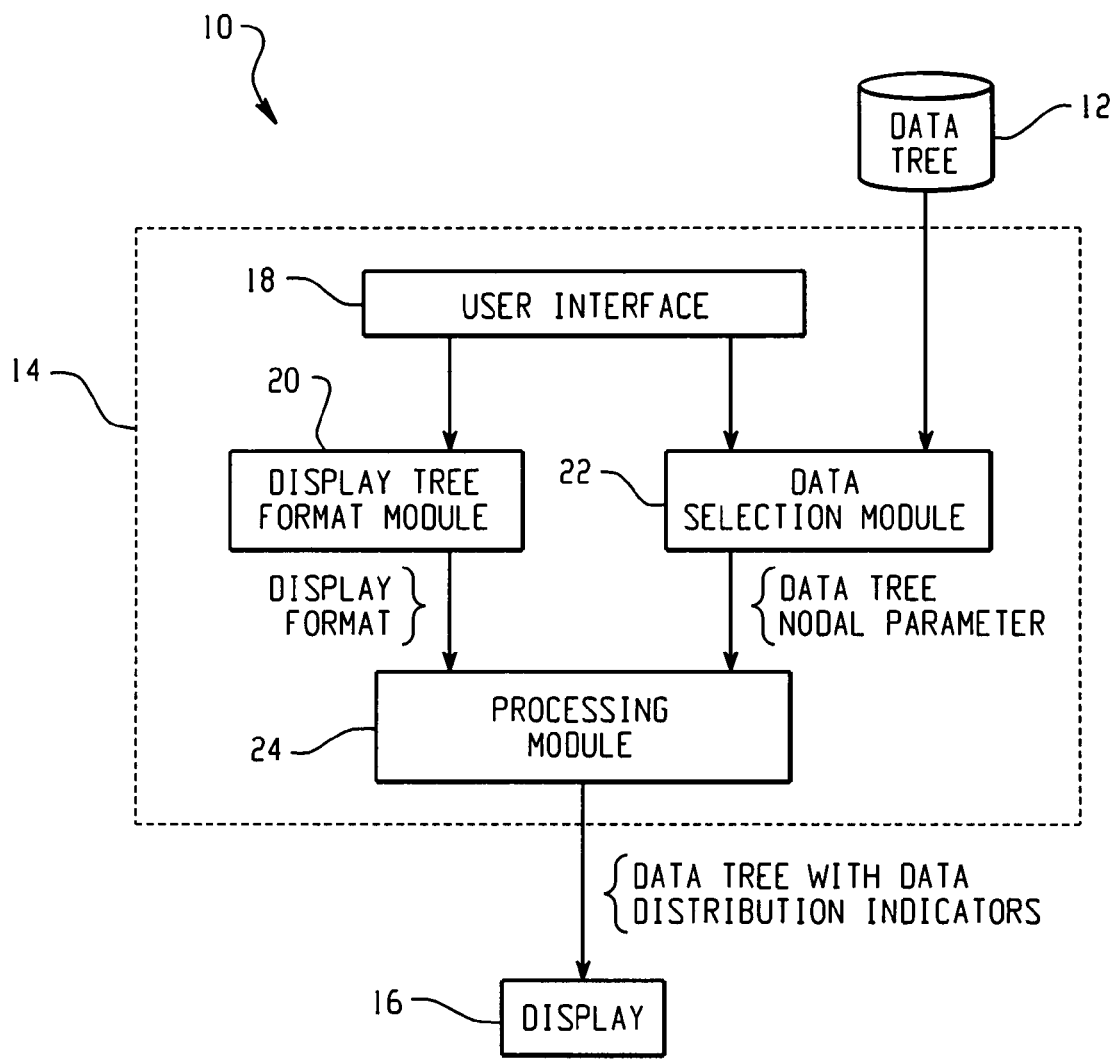
FIG. 1 is a block diagram of an example system for displaying data distributions in data trees.

FIG. 1 is a block diagram of an example system 10 for displaying data distributions in data trees. The system includes a data tree storage facility 12, a computer-implemented software system 14 for generating a data tree display including a plurality of data distribution indicators; and a computer display 16. The computer-implemented software system 14 includes a user interface 18, a display tree format module 20, a data selection module 22, and a processing module 24.

Operationally, a user of the software system 14 interacts with the user interface module 18 to select and format a data tree for display on the computer display 16. The user interfaces with the data selection module 22 to select all or a portion of a data tree from the data tree storage facility 12. If the nodes of the data tree include multiple nodal parameters, i.e., multiple data parameters, then the user may additionally select a data parameter for which the system is to determine relative distributions via the data selection module 22.

Having selected the tree data and the nodal parameter for processing, the user may then interface with the display tree format module 20 in order to determine the display format of the data tree. Using this module 20, the user can select whether to display the tree in horizontal or vertical mode, or the user can select the form of the data distribution indicator to use in the display, or the user can select to associate text or numerical values with the selected data distribution indicators, for example.

After interfacing with the data selection module 22 and the display tree format module 20 is complete, the user then causes the system to execute the software code 24 that processes the data tree to generate the display data including the data distribution indicators. The processing module 24 receives the data tree and the selected nodal parameter from the data selection module 22 and identifies at least one parent node from among the selected nodes of the data tree, the identified parent node being linked to a plurality of child nodes. Following identification of the parent node, the processing module 24 then determines the relative distribution of the selected nodal parameter among the plurality of child nodes associated with the parent node and generates display data including a plurality of graphical connectors that visually link the parent node to the child nodes on the computer display 16. The graphical connectors generated by the processing module 24 include a data distribution indicator that indicates the relative distribution of the nodal parameter among the child nodes. One example form of the data distribution indicator is a progress bar that graphically depicts the relative distribution of the selected nodal parameter.

Figure 2:
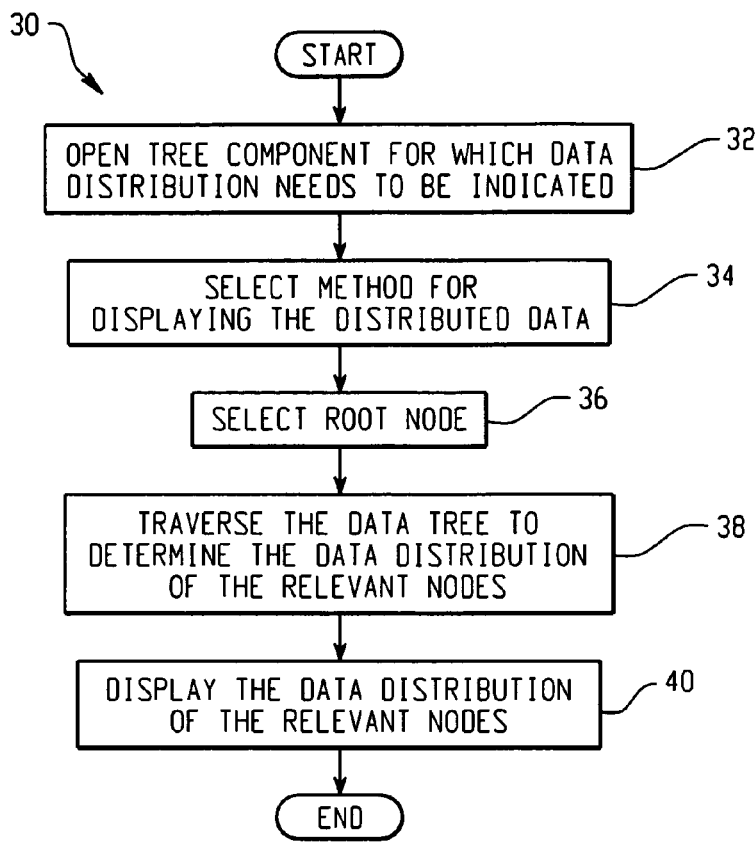
FIG. 2 is a flow chart of an example method for displaying data distributions in data trees.

FIG. 2 is a flow chart 30 of an example method for displaying data distributions in data trees. Beginning at step 32, a data tree component is opened for which data distribution among nodes is to be indicated. As noted above, the data tree component could be an entire data tree or a subset thereof. Moreover, the subset may be selectable by a user of the system that executes the example method or it could be automatically selected by the system as part of a process whereby the user is graphically manipulating a depiction of the data tree. For example, the user may be zooming, rotating, or otherwise manipulating a graphical depiction of the data tree and in response thereto the system may be automatically selecting a different portion of the data tree to determine data distribution among nodes.

At step 34 the method of displaying the distributed data is selected. This may include selecting whether the display should be in a horizontal or vertical mode, selecting from a displayed list of data distribution indicators, or selecting whether to include textual/numerical values along with the data distribution indicators, for example. Following this step, a root node for the data tree is selected at step 36, and at least a portion of the data tree stemming from that root node is then traversed in step 38 to locate the connected parent and child nodes for processing. This step 38 also determines the relative data distribution among the nodes identified in the traversal of the data tree. Step 40 then displays the data tree from the root node according to the selected method in step 34 and including the data distribution information determined in step 38.

Figure 3:
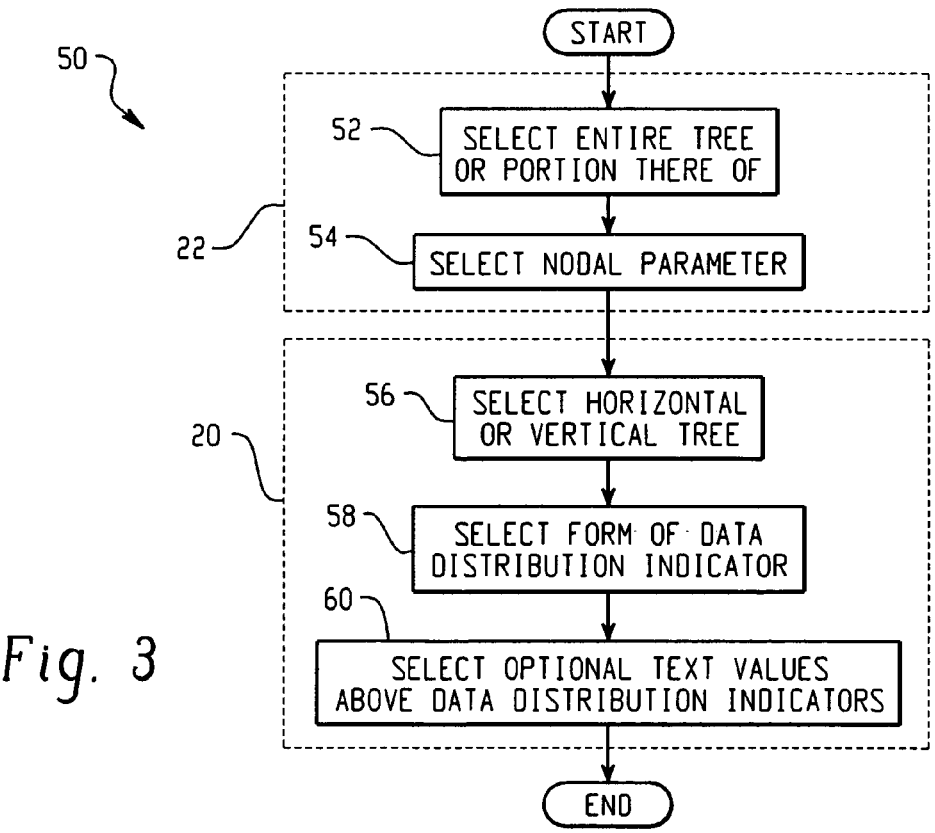
FIG. 3 is a flow chart of an example method for selecting a portion of a data tree and for customizing the format of the display of the data tree with data distribution indicators.

FIG. 3 is a flow chart of an example method 50 for selecting a portion of a data tree and for customizing the format of the display of the data tree with data distribution indicators. At step 52, a user selects an entire data tree, or a portion thereof. Subsequently, at step 54, the user then selects the particular nodal parameter for which the relative distribution among nodes is to be determined. These steps correspond to interactions with a data selection module 22, such as shown in FIG. 1, for example. The user then selects whether the display of the tree data is to be in horizontal or vertical form in step 56. Example vertical tree displays are described in more detail herein with respect to FIGS. 7A/7B and 8A/8B, and example horizontal tree displays are described with respect to FIGS. 9A/9B. Following selection of the display mode for the tree, the user may then select the form of the data distribution indicator in step 58, and may then also select to display optional text or numeric values along with the data distribution indicators in step 60.

The data distribution indicators may take many forms. For example, as shown in FIGS. 7A through 9B, below, the data distribution indicators take on various permutations of a "progress bar." The "progress bar" metaphor is typically used in computing to indicate the present status of a particular task in terms of completion time. For example, when a user is installing a new program on their computer a progress bar is typically displayed which indicates the percentage completion of the installation task. This provides the user with some information regarding the amount of time remaining until the installation is complete. In the present example, however, the progress bar form of data distribution indicator provides a graphical depiction of the relative distribution of data among the child nodes.

Figure 4:
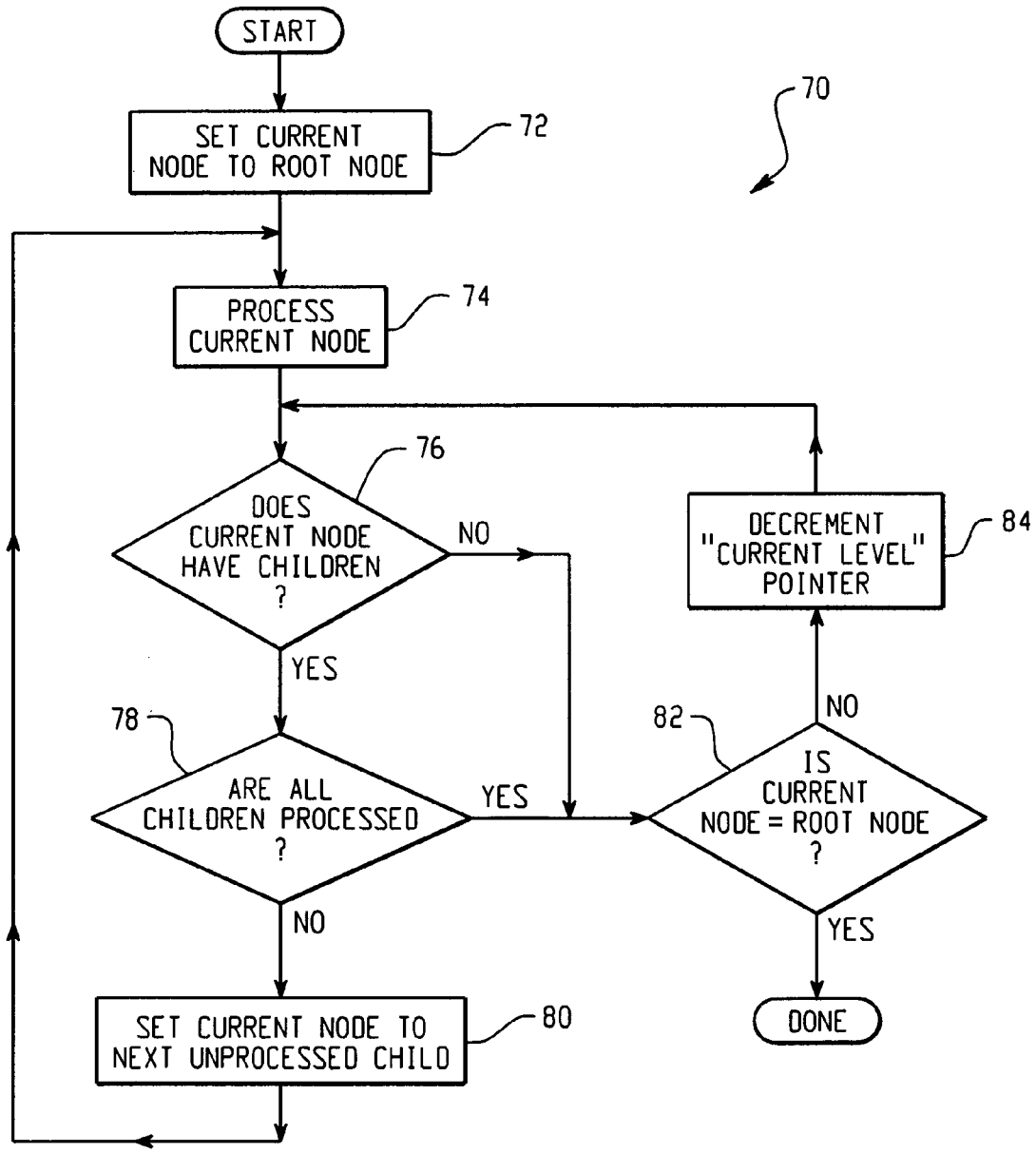
FIG. 4 is a flow chart of an example method for traversing a data tree.

FIG. 4 is a flow chart 70 of an example method for traversing a data tree. At step 72 a variable "current node" is set to be the root node of the tree (or part of the tree) to be traversed for processing. The current node is then processed at step 74 in order to determine the distribution of data among the current node and its associated siblings as set forth, for example, in the method of FIG. 5. If the current node has any child nodes, as determined at step 76, then processing passes to step 78 where it is determined whether all of the child nodes for the current node have been processed. If all the child nodes have been processed, then control passes to step 82. If the current node is the root node, as determined at step 82, and all of the children thereof have been processed, then the method ends. If the current node is not the root node, however, then a pointer "current level" is decremented so as to traverse back up the tree towards the root node and control passes back to step 76. If all of the child nodes are not processed yet, as determined in step 78, then the current node is set to be the next unprocessed child node at step 80 and control passes back to step 74 to continue processing nodes.

Figure 5:
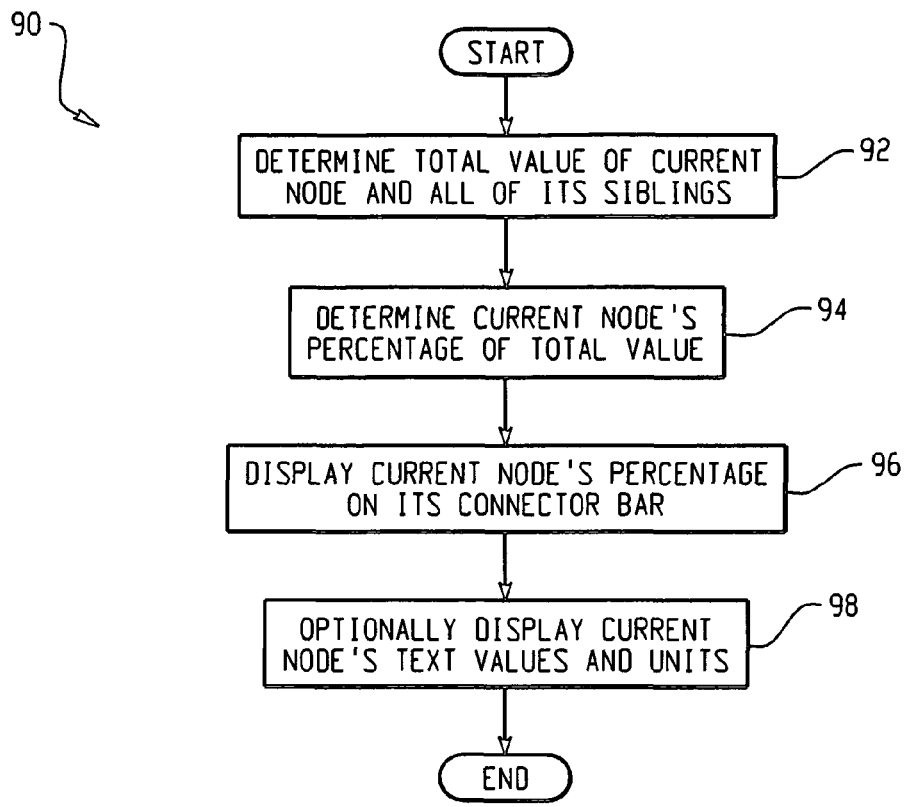
FIG. 5 is an expanded flow chart of an example method for processing a node as set forth in step 74 of FIG. 4.

FIG. 5 is an expanded flow chart 90 of an example method for processing a node as set forth in step 74 of FIG. 4. At step 92 the method determines the total value of the selected nodal parameter for the current node being processed and also the total value of the same selected nodal parameter for all of the siblings to the current node. Step 94 then determines the relative distribution of the current node in relation to its siblings, which may take the form of a percentage value. For example, if the value of the current node is 10 and the value of all the siblings nodes is 90, then step 94 will assign a percentage value of 10% to the current node. Using this relative distribution data, the method then displays a data distribution indicator on a graphical link between the parent node to the current node and the current node. The data distribution indicator graphical depicts the relative distribution of the selected nodal parameter for the current node in relation to its siblings. Optionally, at step 98, the value of the nodal parameter of the current node, in either relative or absolute values, may be displayed along with the data distribution indicator. Thus, in the example given above, step 98 may display the text "10%" along with the data distribution indicator or it may display the absolute value "10."

Figure 6:
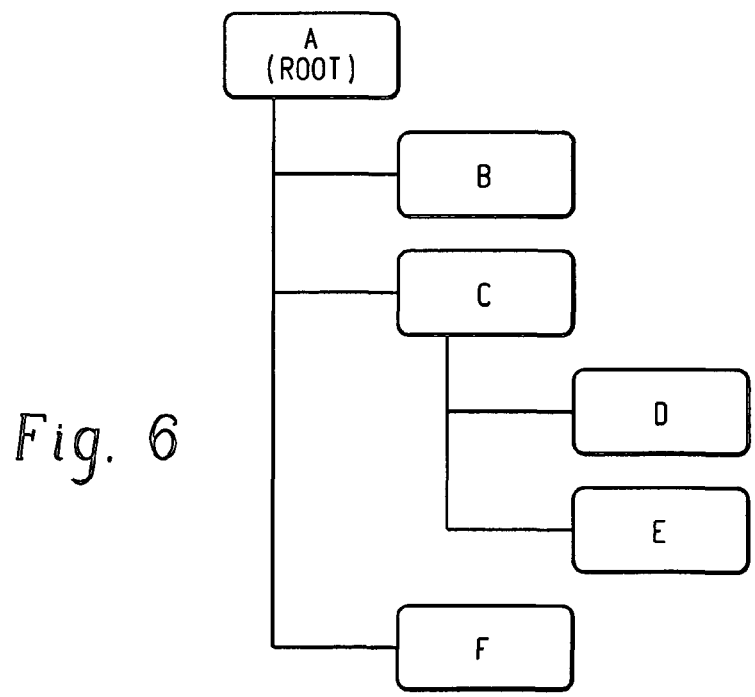
FIG. 6 is an example data tree having six nodes.

FIG. 6 is an example data tree having six nodes. The root node A is the direct parent to nodes B, C and F. The child node C of parent node A is also a parent node to nodes D and E. This example data tree is used to demonstrate the inventive data distribution indicators described herein in reference to the remaining drawings.

Figure 7A:
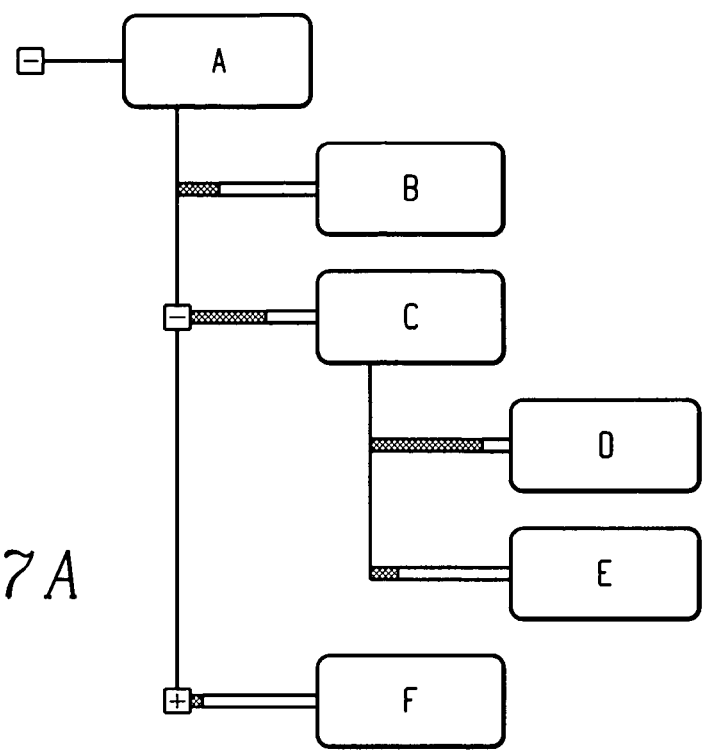
FIGS. 7A/7B and 8A/8B are example vertical data trees having data distribution indicators displayed therewith.
Figure 7B:
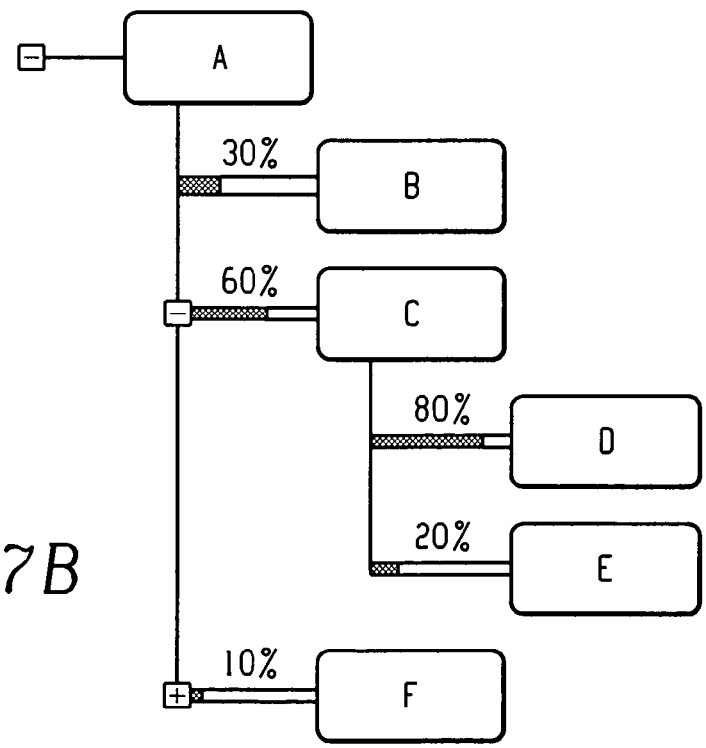

FIGS. 7A/7B and 8A/8B are example vertical data trees having data distribution indicators displayed therewith. FIG. 7A shows that the parent node A is connected to its direct child nodes B, C and F with three data distribution indicators. Each of these data distribution indicators is styled after the "progress bar" metaphor described above, and graphically depicts the relative distribution of a selected nodal parameter of the parent node A amongst its child nodes B, C and F. In this Figure, for example, node C provides the largest percentage of the selected nodal parameter, followed by nodes B and then F. FIG. 7B adds the optional text display along with the data distribution indicator to provide a more exact description of the relative value of each node. FIGS. 7A/7B also show the use of the same form of data distribution indicators for the sibling child nodes D and E to their immediate parent node C. Each of the data distribution indicators in these figures comprise a bar having a fixed length. Within the area of each fixed-length bar is a hashed portion that graphically depicts the relative distribution of the node in relation to the length of the entire connector bar. Thus, for example, in the case of node C, the hashed portion is 60% of the entire length of the connector bar, whereas for node F the hashed portion is just 10% of the length of the connector bar.

Figure 8A:
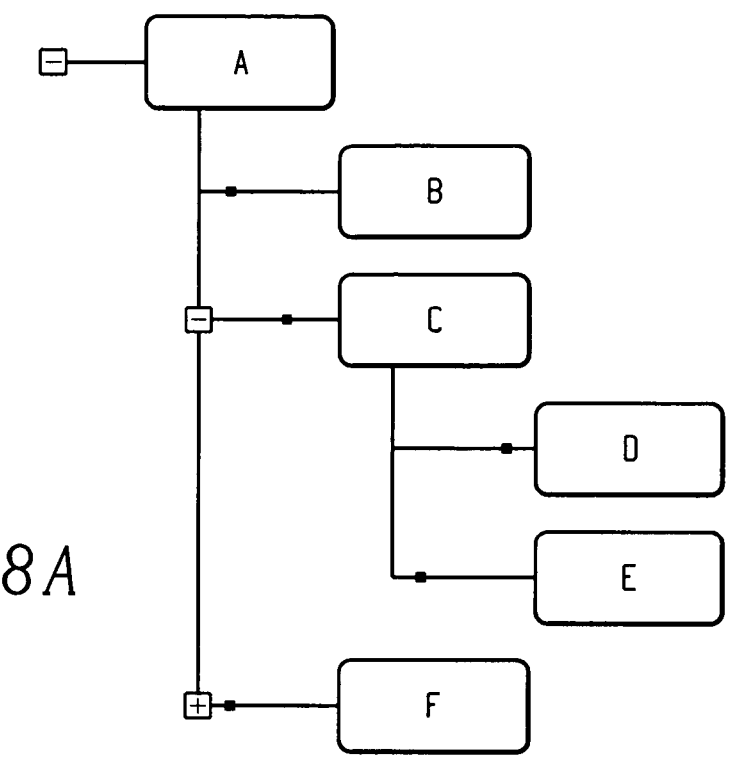
Figure 8B:
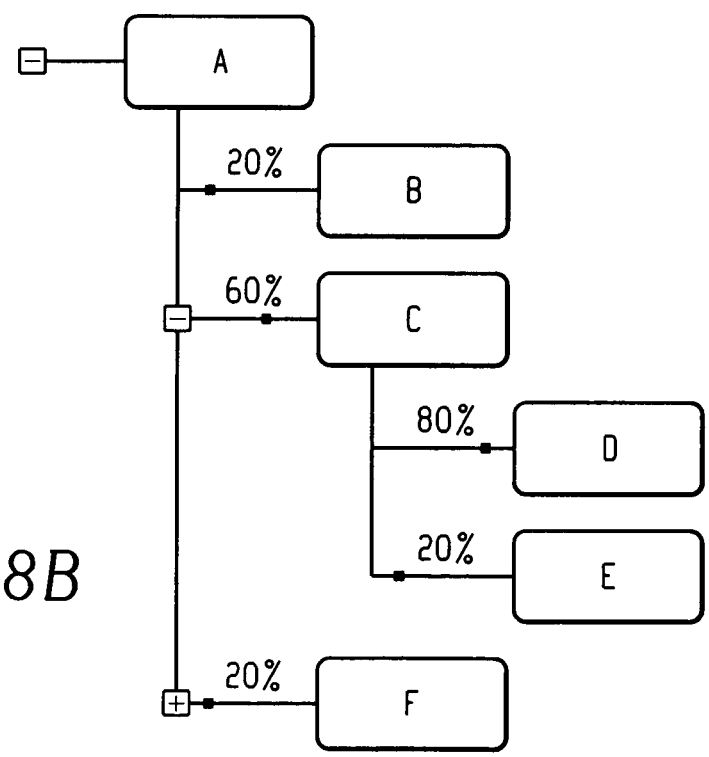

FIGS. 8A/8B are similar to FIGS. 7A/7B, except that the data distribution indicator is graphically depicted as a solid line connector with a square box, or other symbol, positioned along the solid line connector in a position that indicates the relative distribution of the selected nodal parameter. Similar to the progress bar indicator in FIGS. 7A/7B, the data distribution indicator in FIGS. 8A/8B is positioned at a point along the fixed length connector element in a way that quickly provides information to a user as to the relative distribution amongst the sibling nodes. FIG. 8B provides the same optional percentage text values that are shown in FIG. 7B.

Figure 9A:
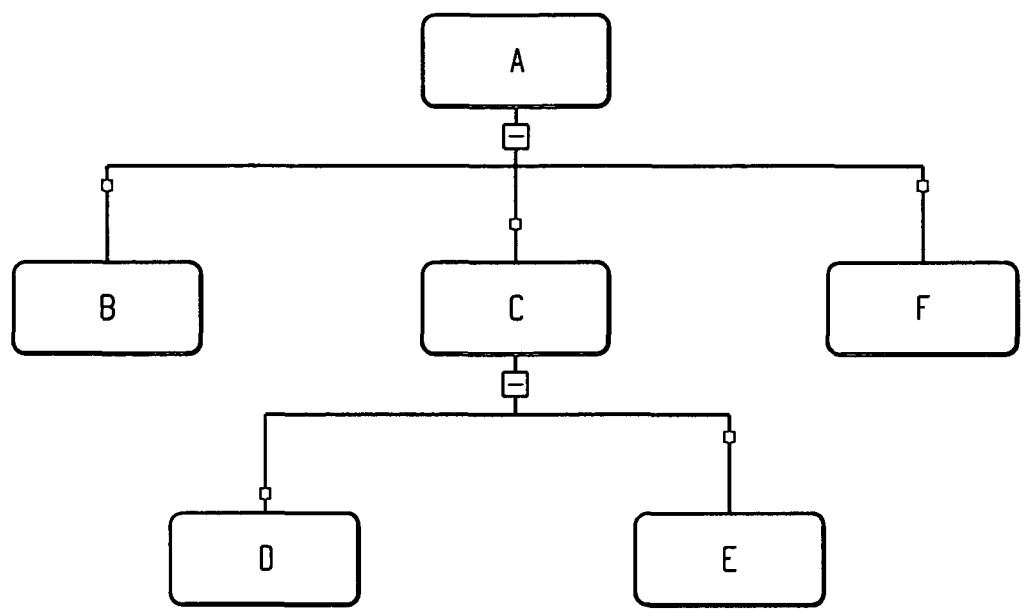
FIGS. 9A/9B are example horizontal data trees having data distribution indicators displayed therewith.
Figure 9B:
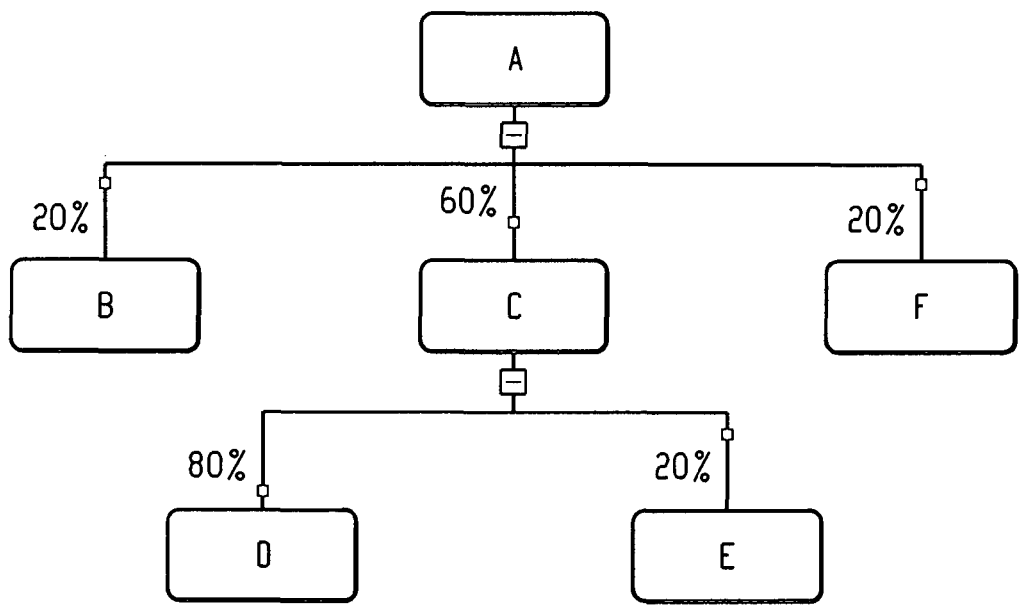

FIGS. 9A/9B are example horizontal data trees having data distribution indicators displayed therewith. These figures are similar to FIGS. 8A/8B, except that the nodes of the tree are depicted in a horizontal tree structure instead of a vertical tree structure.

While certain examples have been used to disclose and illustrate one or more embodiments of the invention, including the best mode, and also to enable any person skilled in the art to make and use the invention, the patentable scope of the invention is defined by the claims, and may include other examples that occur to those skilled in the art.

It is further noted that the systems and methods disclosed herein may be implemented on various types of computer architectures, such as for example on a single general purpose computer or workstation, or on a network (e.g., local area network, wide area network, or internet), or in a client-server configuration, or in an application service provider configuration. Also, the system's and method's data (such as hierarchical dimensional data) may be stored as one or more data structures in computer memory and/or storage depending upon the application at hand. The systems and methods may be provided on many different types of computer readable media including instructions being executable by a computer to perform the system and method operations described herein. The systems and methods may also have their information transmitted via data signals embodied on carrier signals (e.g., radio frequency carrier signals) or other communication pathways (e.g., fiber optics, infrared, etc.).

The computer components, software modules, functions and data structures described herein may be connected directly or indirectly to each other in order to allow the flow of data needed for their operations. It is also noted that a module includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The computer components may be located on a single computer or distributed across multiple computers depending upon the situation at hand.

I claim:

1. A data display method, comprising:
retrieving, using one or more processors, a data tree organized into a plurality of nodes, each node having a corresponding data parameter;
identifying a parent node in the plurality of nodes, wherein the parent node is associated with a plurality of child nodes in the data tree;
determining the current relative distribution of the data parameter among the plurality of child nodes associated with the parent node;
generating a display including the parent node and the plurality of child nodes, wherein a plurality of graphical connectors visually link the parent node to the plurality of child nodes, and wherein each graphical connector depicts non-textual graphics that show the current relative distribution of the data parameter among the plurality of child nodes; and
determining a new relative distribution of the data parameter, wherein each graphical connector visually changes to depict the new relative distribution of the data parameter among the plurality child nodes.

2. The data display method of claim 1, wherein each node has a plurality of data parameters; and wherein one of the plurality of data parameters is selected.

3. The data display method of claim 1, further comprising: selecting either a horizontal or a vertical format for displaying the data tree; and displaying the data tree with the plurality of graphical connectors in either the horizontal or the vertical format in accordance with the selection.

4. The data display method of claim 1, further comprising: selecting a format for the graphical connector from a plurality of different formats.

5. The data display method of claim 1, further comprising: displaying text values in association with the graphical connector, wherein a first text value represents the current relative distribution of the data parameter, and wherein a second text value represents the new relative distribution of the data parameter.

6. The data display method of claim 1, wherein identifying includes traversing the data tree to discover the child nodes that are linked to the parent node.

7. The data display method of claim 6, wherein a child node in the plurality of child nodes is also a parent node to at least one additional child node.

8. The data display method of claim 5, wherein the text value is a percentage value.

9. The data display method of claim 1, wherein colored lines of a predetermined width and a length along each graphical connector depicts the current relative distribution and the new relative distribution of the data parameter.

10. The data display method of claim 1, wherein a square positioned at a point along each graphical connector depicts the current relative distribution and the new relative distribution of the data parameter.

11. A system, comprising:
one or more processors;
one or more computer-readable storage mediums containing instructions operable to cause the one or more processors to perform operations including:
retrieving a data tree organized into a plurality of nodes, each node having a corresponding data parameter;
identifying a parent node in the plurality of nodes, wherein the parent node is associated with a plurality of child nodes in the data tree;
determining the current relative distribution of the data parameter among the plurality of child nodes associated with the parent node;
generating a display including the parent node and the plurality of child nodes, wherein a plurality of graphical connectors visually link the parent node to the plurality of child nodes, and wherein each graphical connector depicts non-textual graphics that show the current relative distribution of the data parameter among the plurality of child nodes; and determining a new relative distribution of the data parameter, wherein each graphical connector visually changes to depict the new relative distribution of the data parameter among the plurality child nodes.

12. One or more computer-readable storage mediums encoded with instructions that when executed, cause one or more computers to perform a method comprising:

retrieving a data tree organized into a plurality of nodes, each node having a corresponding data parameter;

identifying a parent node in the plurality of nodes, wherein the parent node is associated with a plurality of child nodes in the data tree;

determining the current relative distribution of the data parameter among the plurality of child nodes associated with the parent node;

generating a display including the parent node and the plurality of child nodes, wherein a plurality of graphical connectors visually link the parent node to the plurality of child nodes, and wherein each graphical connector depicts non-textual graphics that show the current relative distribution of the data parameter among the plurality of child nodes; and determining a new relative distribution of the data parameter, wherein each graphical connector visually changes to depict the new relative distribution of the data parameter among the plurality child nodes.

13. The system of claim 11, wherein each node has a plurality of data parameters; and wherein one of the plurality of data parameters is selected.

14. The system of claim 11, further comprising:
selecting either a horizontal or a vertical format for displaying the data tree; and
displaying the data tree with the plurality of graphical connectors in either the horizontal or the vertical format in accordance with the selection.

15. The system of claim 11, further comprising:
selecting a format for the graphical connector from a plurality of different formats.

16. The system of claim 11, further comprising:
displaying text values in association with the graphical connector, wherein a first text value represents the current relative distribution of the data parameter, and wherein a second text value represents the new relative distribution of the data parameter.

17. The system of claim 11, wherein identifying includes traversing the data tree to discover the child nodes that are linked to the parent node.

18. The system of claim 17, wherein a child node in the plurality of child nodes is also a parent node to at least one additional child node.

19. The system of claim 16, wherein the text value is a percentage value.

20. The system of claim 11, wherein colored lines of a predetermined width and a length along each graphical connector depicts the current relative distribution and the new relative distribution of the data parameter.

21. The system of claim 11, wherein a square positioned at a point along each graphical connector depicts the current relative distribution and the new relative distribution of the data parameter.

22. The method of claim 12, wherein each node has a plurality of data parameters; and wherein one of the plurality of data parameters is selected.

23. The method of claim 12, further comprising:
selecting either a horizontal or a vertical format for displaying the data tree; and
displaying the data tree with the plurality of graphical connectors in either the horizontal or the vertical format in accordance with the selection.

24. The method of claim 12, further comprising:
selecting a format for the graphical connector from a plurality of different formats.

25. The method of claim 12, further comprising:
displaying text values in association with the graphical connector, wherein a first text value represents the current relative distribution of the data parameter, and wherein a second text value represents the new relative distribution of the data parameter.

26. The method of claim 12, wherein identifying includes traversing the data tree to discover the child nodes that are linked to the parent node.

27. The method of claim 26, wherein a child node in the plurality of child nodes is also a parent node to at least one additional child node.

28. The method of claim 25, wherein the text value is a percentage value.

29. The method of claim 12, wherein colored lines of a predetermined width and a length along each graphical connector depicts the current relative distribution and the new relative distribution of the data parameter.

30. The method of claim 12, wherein a square positioned at a point along each graphical connector depicts the current relative distribution and the new relative distribution of the data parameter.

* * * * *